United States Patent [19]

Jensen

[11] Patent Number: 4,587,695
[45] Date of Patent: May 13, 1986

[54] SNAP-IN LATCH MOUNTING BRACKETS

[75] Inventor: Kirk Jensen, Allen Park, Mich.

[73] Assignee: Irvin Industries Inc., Rochester, Mich.

[21] Appl. No.: 571,083

[22] Filed: Jan. 16, 1984

[51] Int. Cl.⁴ ............................................. A44B 11/25
[52] U.S. Cl. ......................................... 24/634; 24/615; 24/643
[58] Field of Search ................. 24/634, 636, 637, 643, 24/646, 647, 648, 649, 662, 664

[56] References Cited

U.S. PATENT DOCUMENTS

| | | | |
|---|---|---|---|
| 1,361,645 | 12/1920 | Tomchin | 24/643 X |
| 1,459,674 | 6/1923 | Jabner | 24/634 |
| 2,153,077 | 4/1939 | Clarke | 24/634 |
| 3,201,840 | 8/1965 | Jantzen | 24/634 |

FOREIGN PATENT DOCUMENTS

| | | | |
|---|---|---|---|
| 694720 | 9/1965 | Italy | 24/634 |
| 42209 | 9/1922 | Switzerland | 24/634 |
| 1430654 | 3/1976 | United Kingdom | 24/634 |

Primary Examiner—William E. Lyddane
Assistant Examiner—Peter A. Aschenbrenner

[57] ABSTRACT

Snap-in installation double latch release bracket for retaining passenger car cargo cover end caps.

7 Claims, 5 Drawing Figures

U.S. Patent May 13, 1986 4,587,695
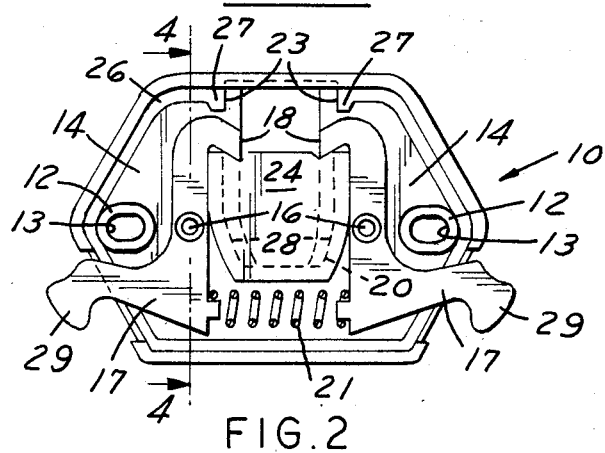
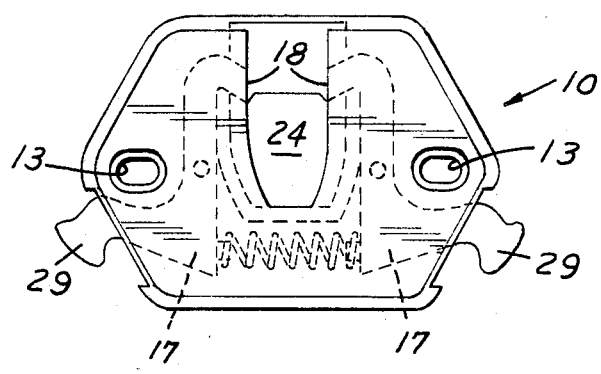
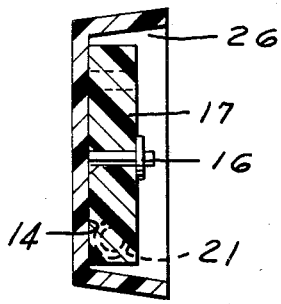
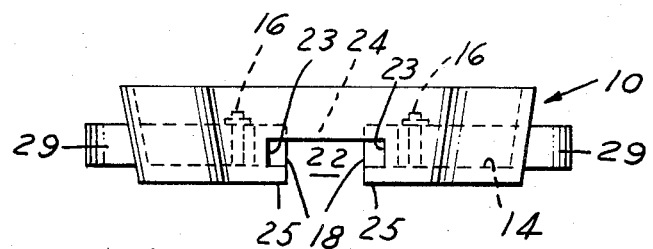
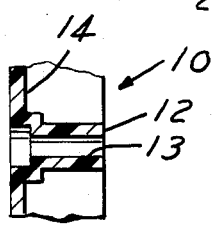

SNAP-IN LATCH MOUNTING BRACKETS

BACKGROUND OF THE INVENTION

Passenger car cargo covers of the type employing spring retraction rolls require mounting brackets for end caps accommodating roll removal when not in use. Open slots in such brackets have been found to involve a hazard when a roll comes loose during an accident with a potential for injuring occupants. Accordingly, certain vehicle manufacturers have required means for retaining the end caps which require manual release. Prior art constructions to meet such requirement include, as most relevant, a spring actuated slide which traps the end cap when installed in the bracket. The slide has a manually accessible projection which must be actuated to an open position both to install and to release the end cap. The slide in such bracket moves transversely to the end cap slot and the transverse motion of the slide requires a bracket depth exceeding that necessary for the slot per se which, in some cars, involves unavailable space. Furthermore, the requirement for manual release of the trapping element for installation adds inconvenience to reinstallation of the roll after removal.

BRIEF DESCRIPTION OF THE PRESENT INVENTION

Applicant has developed an improvement in a cap retaining bracket which provides two main advantages over the prior bracket. The retaining elements all lie in the same plane as the slot per se and involve no requirement for additional depth of bracket. In addition, installation is accommodated by a snap action requiring no direct manual displacement of the retention elements. Dual latch levers engage side edges of the end cap with a resilient snap action accommodating entry of the end cap by merely pressing it into the slot. The levers are spring loaded into engaging position by a single compression spring and release is effected by squeezing exposed extremities of the respective layers offset from the lever pivots.

BRIEF DESCRIPTION OF THE DRAWINGS

FIG. 1 is an outside end view of the bracket;
FIG. 2 is an inside face view of the bracket;
FIG. 3 is a top plan view of the bracket;
FIG. 4 is a sectional view taken along the line 4—4 of FIG. 1;
FIG. 5 is a fragmentary sectional view of one of two mounting holes formed in the bracket housing.

DESCRIPTION OF PREFERRED EMBODIMENT

With reference to FIG. 1 bracket housing 10 has a mounting perimeter 11 including registration surfaces 12 surrounding attachment holes 13 and providing a general cavity terminating in an end face 14 from which integral pivot pins 16 project for a pair of bellcrank latch levers 17 having latch hooks 18 for engaging either side shoulder of an end cap 19 having tapered nose 20 adapted to spread latch hooks 18 upon entry from the top against the resilient bias of compression spring 21 thereby providing a double latch snap engagement of the end cap when inserted within slot 22 which has side entrance walls 23, a back wall 24 and retaining lips 25. Ribs 26 formed in the housing with projections 27 together with the upper shoulders of end cap retaining walls 28 provide a narrow passage for latch ends 18 with minimal clearance relative to projections 27 such that flexure of pivots 16 under extreme extraction loads on the end cap will produce abutment reaction protecting the pivots from undue stress.

FIGS. 2 and 3 illustrate the bracket housing per se, with end cap omitted having shoulders which will slide into slot 22 through its open top and an extension normal to the plane of FIG. 2 connecting to the cargo cover retraction roll.

From the above description it will be understood that squeezing thumb and finger pressure on projecting knobs 29 of respective latch levers against resistance of compression 21 will release the end cap for manual retraction.

I claim:

1. Double latch release bracket for retaining passenger car cargo cover end cap comprising bracket housing means with a mounting perimeter for attachment to a rigid planar surface, said housing means including a face (14) parallel to and spaced from said mounting perimeter having an integral slotted end cap enclosure with an open entrance end slot (22) defined by back wall (24), side walls (28), and retaining lips (25) respectively formed in the bracket, said slot being provided in said face and extending within said retaining lips to accommodate an end cap extension through and normal to said face, a coplanar cavity within said housing extending around the side walls and under said end cap enclosure, a pair of pivoted latch levers within said cavity having facing hook end means to engage shoulders on either side of an end cap inserted within said enclosure, resilient means biasing said levers toward hook end closure end cap engagement, and manually actuable lever extension means (29) operably connected to the latch levers for overcoming said resilient bias to release said end cap.

2. The bracket of claim 1 including housing projections (27) within said perimeter forming a reaction stop for said hook ends engageable upon deflection of the lever pivots resulting from any excessive extraction force on the end cap while said hook ends are engaged.

3. The bracket of claim 1 wherein said resilient means include a compression spring extending between said latch levers in the cavity under said end cap enclosure.

4. The bracket of claim 1 including means adapting said hook ends to separate upon end cap insertion into said enclosure providing snap-in engagement without direct manual actuation of said levers to an open position.

5. The bracket of claim 1 wherein each latch lever is constructed with a linear element pivoted at an intermediate position, said element terminating at one extremity in said hook end, a compression spring engagement at the other extremity, and said lever having a lateral extension from its other extremity terminating in a manually engageable release knob.

6. The bracket of claim 1 including a pair of attachment hole columns (12) extending through said cavity between the plane of said perimeter and said face in parallel alignment with the pivots of said latch levers.

7. The bracket of claim 6 including an opening in the attachment perimeter of said housing adjacent said hole columns for said lateral lever extensions.

* * * * *